(12) United States Patent
Banerjee

(10) Patent No.: US 6,771,622 B1
(45) Date of Patent: Aug. 3, 2004

(54) PILOT-SIGNAL SEARCHING WITH DECIMATION REORDERING

(75) Inventor: Debarag N. Banerjee, Milpitas, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 796 days.

(21) Appl. No.: 09/715,306

(22) Filed: Nov. 17, 2000

(51) Int. Cl.[7] ............................ H04Q 7/00; H04B 7/216
(52) U.S. Cl. .................. 370/331; 370/335; 370/342; 370/441; 455/436; 455/502; 375/145; 375/149; 375/150
(58) Field of Search ................................. 370/329, 331, 370/335, 342, 441; 455/436–438, 442, 502; 375/130, 145, 149, 150

(56) References Cited

U.S. PATENT DOCUMENTS

| | | | | |
|---|---|---|---|---|
| 5,805,648 A | * | 9/1998 | Sutton | 375/367 |
| 6,175,561 B1 | * | 1/2001 | Storm et al. | 370/342 |
| 6,195,551 B1 | * | 2/2001 | Kim et al. | 455/436 |
| 6,650,629 B1 | * | 11/2003 | Takahashi et al. | 370/335 |
| 2002/0067762 A1 | * | 6/2002 | Neufeld et al. | 375/149 |

FOREIGN PATENT DOCUMENTS

WO    WO 02/065660 A1 *   8/2002    ............ H04J/13/00

\* cited by examiner

*Primary Examiner*—Steven H. D Nguyen
*Assistant Examiner*—Roberta Stevens

(57) ABSTRACT

An example application of the invention is directed to a mobile receiver searching pilot signals in a CDMA-based radiotelephone communications system. The receiver processes received pilot signals by first decimating those pilot signals that have a search window length that is greater than a threshold number of chips, into a plurality of sub-windows. The other pilot signals and the sub-windows are then searched using a common prioritization criteria. More specific implementations of this approach permit each search of this type to take a fixed amount of time, thereby making scheduling calculations easy to implement. Moreover, such implementations provide for all pilots to be searched equally often irrespective of window sizes, and for less likely candidates for idle handoff (pilots with longer window sizes) not to be given precedence over more likely idle handoff candidates. Also, as search results are accumulated, the amount of unsearched PN space within a window decreases, thereby decreasing the probability of finding a strong pilot and increasing the ability for more intelligent scheduling.

23 Claims, 5 Drawing Sheets

PILOT-SIGNAL SEARCHING WITH DECIMATION REORDERING

FIELD OF THE INVENTION

The present invention relates generally to cellular-type communication systems. The present invention has application, for example, as part of a radio receiver using digital signal processing circuitry to perform pilot strength searches.

BACKGROUND OF THE INVENTION

Large-user radio communication systems have been developed into a complex inter-networked web of systems deployed to provide coverage internationally. Examples of such systems include cellular radio communication systems and other wireless systems such as wireless LANs. A cellular radio communication system includes multiple communication cells arranged adjacent one another to cover a larger regional area. Each cell limits the number of possible simultaneous communications to the number of channels provided in the cell. The size of the cell is defined through receivers and transmitters (a.k.a., "transceivers") located within base stations that provide the communication channels through which the mobile radios communicate. A mobile radio communicates in a cellular system by communicating first with a number of close-proximity base stations before selecting the best or nearest base station with which to establish a radio communication link.

In providing a clear channel between the mobile radio and the selected base station, the prevention of interference from and to other radio communication links is an important concern. Generally, this concern is addressed through the use of an accurate method for determining the nearest base station and by controlling the transmission power levels used in maintaining the communication. If the nearest base station is not accurately selected or changes without a timely update, the communication can overlap and interfere with other communications in the system.

In the context of a specific system such as a cellular communication system, the mobile stations select the nearest base station by monitoring a control channel transmitted from each base station for its signal strength and selecting the nearest base station in response to comparing these channel reception levels for the best signal quality. The transmission power is controlled at minimum levels by using algorithms at the base station and/or the mobile radio and, in some systems, also by passing control information between the base station and the mobile radio during the communication. Many of these systems use direct-sequence, spread-spectrum (DSSS) code-division-multiple-access (CDMA) communication. In this type of system, the same frequency is commonly used by a plurality of users by breaking apart the communication and transmitting using different codes. At any given frequency, the signals of other users interfere with the measurements for the signal quality of the transmitting base stations. In an attempt to account for this interference, measurement methods determine the signal quality by computing the ratio of the signal reception level and the interference level, which is known as "SIR" or Signal to Interference Ratio, as described for example, by T. Dohi, et al: "Performance of SIR Based Power Control in the Presence of Non-uniform Traffic Distribution," 1995 Fourth IEEE International Conference on Universal Personal Communications Record, pp. 334–338, November 1995. In addition to the SIR, the signal quality determination is also dependent on the estimates of the signal reception level which, in turn, are dependent on the signal propagation and the accuracy in which these estimates are communicated, a problem known as "multi-path Rayleigh fading." Multi-path Rayleigh fading ("fading") is caused by reflections of the signals being received from the base stations through the wireless communication medium.

Communication of measured radio frequency (RF) signal strength is also subject to such fading. In CDMA-based cellular communication systems, the mobile station's selection of the nearest base station often consists of a search for the optimal CDMA pilot strength of beacon signals transmitted from each base station to determine whether a handoff from the current base station to another base station should occur. Within each mobile station, the transmitted beacon signal is demodulated in a spread spectrum receiver using a correlation process in which the received signal is correlated with a replica of the signal used in the transmitter to spread the signal through the bandwidth. For spreading direct-sequence spread spectrum ("DSSS") signals, the signals are typically spread using a pseudo-random noise binary sequence or ("PN" code). The receiver despreads the DSSS signals by proper synchronizing the spreading waveform with a replica of this same PN binary sequence.

The pilot beacons of each base station use the same PN code and are differentiated by unique offsets to the sequence. The estimated strength of a PN-code offset associated with a base station (i.e., pilot strength) is used by the mobile in the idle mode to decide which base station to perform a handoff to. The estimation process is referred to as "searching," which involves correlating the input signal with a locally generated PN-sequence with the corresponding offset. The handoff decisions taken in the idle mode (Idle Handoff) of the mobile station operation are purely mobile-controlled, i.e., without any base station interaction.

The cellular base stations transmit a (General/Extended) Neighbor List Message that contains the PN-code offsets (often called pilot PN) of all nearby base stations such that the mobile can concentrate on searching them. Each neighbor pilot is also associated with a priority and a window size. Since not all neighboring base stations are as likely to have a powerful enough signal in the coverage area of the base station transmitting the Neighbor List Message, the priority indicates how important it is to search that pilot. Since all base stations are not equidistant from the present base station, the window indicates the range of PN-code offsets to search for detecting the corresponding base station; in general, the longer the window specified, the farther away the base station is from the signal-receiving mobile station. While no guidelines specify how the mobile should use these priority and window data to perform the searches, a typical implementation involves searching the entire window (corresponding to a pilot PN) in its entirety before moving on to another pilot, irrespective of the window length and priority of the pilot.

A problem with implementing this searching approach involves the potentially-conflicting concurrent duties carried out by the mobile station. For example, the mobile station's Idle Mode includes a slotted-mode operation in which the mobile station only monitors the strengths of the base station for a short period of time (e.g., about 80 ms) in relatively long time intervals (e.g., 1.28 s). Hence, even with a relatively fast searcher it is not possible to search all the PN-codes necessary to cover all the windows of the neighbors within a typical channel-coherence time. Moreover, the time required to search a large window may be too large relative to the wake-up period (e.g., 80 ms).

Accordingly, there is a need for an improved approach to pilot-strength searching and related signal processing in such communication systems.

SUMMARY

According to various aspects of the present invention, embodiments thereof are exemplified in the form of methods and arrangements involving a CDMA receiver implemented to search for the pilot signals in a more efficient and accurate manner.

According to the present invention, an example application is directed to a CDMA communication system involving searching of a set of pilot signals, including a first pilot signal having a search window length that is greater than a threshold number of chips and including a second pilot signal having a search window length that is not greater than the threshold number of chips. The search window for the first pilot signal is decimated into a plurality of sub-windows, and then the second pilot signal and one of the sub-windows is searched using a common prioritization criteria.

Another example application of the present invention is directed to methods and arrangements for conducting such searching of the pilot signals at the mobile station. A more particular aspect of the present invention is directed to a specific CDMA cellular application. In this application, a communications system includes a mobile station communicating with a plurality of base stations. The pilot search results are processed in the mobile station's receiver to provide samples of the search results for each PN code. These samples are processed to determine which of the pilot signals represents the strongest.

In another specific implementation, base stations are located to cover a designated geography by communicating with mobile stations in respective geographic cells. Each base station generates a pilot signal, so that the base stations collective generate a set of pilot signals, including a first pilot signal having a search window length that is greater than a threshold number of chips and a second pilot signal having a search window length that is not greater than a threshold number of chips. Each mobile station includes a signal processor circuit that is configured and arranged to search the set of pilot signals, to decimate the search window for the first pilot signal into a plurality of sub-windows, and to search the second pilot signal and one of the sub-windows based on a prioritization criteria that is common to each of the second pilot signal and one of the sub-windows.

Another example CDMA-based cellular application is directed to a method of combining the priority and the window size information in order to sequence the searches in the idle mode such that pilots with higher apriori probability of being a candidate for idle handoff are searched more frequently, and all pilots, regardless of window size are given a fair chance at getting searched, and hence increases the probability of Idle Handoffs occuring promptly. This in turn lowers the probability of the Active Set signal strength from falling below any particular level—thus increasing the reliability of paging message reception.

The above summary is not intended to provide an overview of all aspects of the present invention. Other aspects of the present invention are exemplified and described in connection with the detailed description.

BRIEF DESCRIPTION OF THE DRAWINGS

Various aspects and advantages of the present invention will become apparent upon reading the following detailed description of various embodiments and upon reference to the drawings in which:

FIG. 1 is a logical block diagram of a spread spectrum communication system, according to a specific example embodiment and example application of the present invention.

While the invention is amenable to various modifications and alternative forms, specifics thereof have been shown by way of example in the drawings and will be described in detail. It should be understood, however, that the intention is not to limit the invention to any particular embodiment described. On the contrary, the intention is to cover all modifications, equivalents, and alternatives falling within the spirit and scope of the invention as defined by the appended claims.

DETAILED DESCRIPTION

The present invention has a variety of applications to pilot signal searching and has been found to be particularly advantageous for use in connection with CDMA radio communication receivers adapted to conduct pilot signal searches. A specific example application benefiting from implementations of the present invention includes pilot signal strength searches in cellular communication systems. While the present invention is not necessarily limited to such applications, various aspects of the invention can be appreciated through a discussion of example embodiments implemented in this context.

According to one example embodiment, the present invention is directed to a radio receiver including a data processing arrangement programmed to process a stream of data samples presented in a CDMA environment. In accordance with the present invention, multiple stations of a first type transmit pilot signals that are used by one or more stations of a second type to assess the signal quality of each respective transmitted pilot signal and/or determine which of the multiple stations of a first type is geographically closest to the signal-assessing station of the second type. In one example embodiment, the pilot signals transmitted by the multiple stations use one or more PN codes which are known and used in the decoding/despreading process by the stations of the second type and are ultimately differentiated by unique offsets to the PN sequence. The pilot signals are differentiated in this regard to provide the above-mentioned assessment(s).

In another related application that is exemplified in a specific embodiment below, the CDMA environment is defined by the communication protocol of a CDMA-based cellular communication system and the pilot signals transmitted by the multiple stations use a single common PN code. The estimated strength of a PN-code offset associated with a base station (i.e., pilot strength) is used by the mobile in the idle mode to decide which base station to perform a handoff to. The estimation process is referred to as "searching." In many implementations, although not necessary, the logical blocks of the mobile station's receiver are implemented to perform the above described tasks in the form of a programmed digital signal processing arrangement, for example, as is commonly implemented in chip sets commercially available for current cellular radio telephones.

Various aspects of this CDMA-type cellular embodiment is best understood in connection with a specific example application, such as the CDMA communication system illustrated in FIG. 1. The system includes a plurality of base stations 100 communicating with a CDMA communication device 101, the receiver portion of which is shown. The CDMA communication device 101 is adapted to perform the data processing operation described above for the DSSS CDMA cellular system. In this example application, a symbol to be transmitted to the CDMA communication device 101 is spread by a pseudo-noise (PN) reference sequence with a chip rate that is substantially greater than a symbol rate of the signal, so as to form a spread spectrum signal. In this context, the duration of the bit pulse in the waveform used to spread the signal in the second modulation is referred to as the "chip interval" (or sometimes "chip"), and its inverse is referred to as the "chip rate." Such a spread spectrum signal is modulated onto a carrier for transmission as described, for example, in TIA/EIA Interim Standard TIA/EIA/IS-95-A. It will be appreciated that reference may be made to various other publicly-available documents for details of such cellular-communication operation; these documents include, among others: ANSI-J-STD-008, TIA; IS-95B, TIA; IS-98A, TIA; ANSI-J-STD-018, TIA; IS-98C, TIA; and *Analysis of Handover Algorithms*, M. Gudmundson, IEEE Vehicular Techn. Conf., St. Louis, Mo. pp. 537–541, May 1991.

The CDMA communication device 101 receives a modulated spread spectrum signal s(t). In the communication device 101, received multipath components of the transmitted modulated spread spectrum signal s(t) are resolved at sub-chip resolution. The communication device 101 includes a receiver front-end 102 coupled to an antenna 103 receiving the modulated spread spectrum signal s(t). The front end 102 filters and amplifies the received signal s(t) and carrier-demodulates the received signal s(t) as is conventional. The communication device 101 can be a unidirectional device only receiving the signal s(t), or as in most applications, the device 101 is a bi-directional communication device including, among other blocks in a transmitter branch 107, a power amplifier 108. The transmitter branch 107 is adapted to generate a spread spectrum signal as described in the above-mentioned TIA/EIA Interim Standard (and related) documentation.

The receiver front-end 102 provides a demodulated spread spectrum signal in the form of quadrature base band samples sI(nTs) and sQ(nTs) from internally-produced quadrature base band signals sI(t) and sQ(t), t being time, n being an integer, and "1/Ts" being a sampling rate exceeding the chip rate of the received signal s(t). The device 101 retrieves the symbols or the bits intended for it by correlating the samples with a locally generated PN sequence which is the same as the PN reference with which the symbol was transmitted. Thus, for each PN sequence, the communication device 101 performs decoding functions including PN despreading and coherent and noncoherent signals as indicated generally at blocks 110a, 11b through block 110n and, more specifically, within each such block in corresponding subblocks (e.g., blocks 112a and 114a for block 110a).

For conducting the pilot signal search, the communication device 101 further includes a combination search-scheduler/search-reordering block 120 that is adapted to selectively schedule the searching for samples of a pilot signal for each PN sequence. This scheduling, which is logically depicted using the "on/off" inputs to each decoding block 110a through 110n, is performed as described in more detail below to accommodate the advantageous nature of the searching in accordance with the present invention. With the exceptions discussed below, the pilots are typically searched in a sequence that schedules consecutive searches of the same pilot at different search intervals; this approach is described in connection with U.S. Patent Application, entitled Modified Filtering for Asynchronous Inputs, Ser. No. 09/640,128 (VLSI.290PA), filed on Aug. 16, 2000, incorporated herein by reference in its entirety.

From the decoding blocks 110a through 110n, results of the search for the respective pilot signals are optionally processed by respective filters 125a, 125b through 125n, in a manner consistent with the filter embodiments described in connection with the above patent document. As depicted in connection with block 122, the block 120 generates the sampling intervals as used by each such filter to factor in the time difference between consecutive searches for the pilot strength signal. In one particular example implementation, a modified IIR filter is used with the coefficients of the IIR filter being altered depending on the time-arrival differences of the consecutive search results for each PN sequence, and the relative arrival time is determined as an approximate integral multiple of unit sample intervals for the filtering.

In many cellular applications, the set of search results provided by the outputs of the depicted filters 125a through 125n are presented to the communicatively-coupled base station to represent a set of hand-off candidates. In response, the base station determines when and where to hand-off the communication. As will be discussed further below, in accordance with an aspect of the present invention, the pilot signal searching process performed by the respective mobile stations moots the need for the communicatively-coupled base station to assess the filtered outputs for the purpose of assessing the best hand-off candidates during the idle mode.

According to other important aspects of the present invention, neighbor set searches of pilot signals are performed to take into account that some searches may take longer than others due to the longer window specified on some, or in some instances (such as those described in the above references) all of neighbor pilots, or even the active set pilot. According to the present invention, searching on pilot signals having search window sizes greater than the window size used in the search engine is performed by searching the entire window for each such pilot signal using multiple task-execution blocks, and by queuing each of the multiple task-execution blocks along with queued search tasks for pilot signals having search window sizes that are not greater than the above-mentioned window size. At least initially, each type these queued search tasks is treated with the same searching priority. This technique can be referred to as a decimated-reordering search, since the long-windowed pilots are decimated and then order at least initially with equal value relative to the other pilots.

A specific example embodiment of this decimated reordering search approach involves, search a certain number of chips (an integral multiple of inverse of search resolution) for a first one of the long-windowed pilots and moving on to the searching process for another pilot with the expectation (but not necessarily) that the search on the first long-windowed pilot will be resumed some later time. While a nondecimated search of the long-windowed pilots would require less overhead, various embodiments of this decimated reordering search approach can be implemented to overcome various problems associated with long-windowed pilots. For instance, if a few pilots in the set have long window sizes, it may take so much time to search them that the other searches would need to be postponed to the next wake up period. This will delay overall pilot detection. Furthermore, pilots from base stations that are further away from the active base station typically have longer window sizes. However, the pilot strengths from these base stations are expected to be weaker (since they are further away). This relationship means that the mobile will be spending more time searching for less-likely idle handoff candidates while more-likely candidates might be kept waiting. Moreover, because there is an expected correlation between results from adjoining search resolution, it is expected that the information value of such a search will have a diminishing return over increasing search time. For example, a 226-chip search will take about fifteen times longer than a 16-chip search, but the information value may not be fifteen times higher.

Accordingly, various embodiments of the present invention can be implemented so that this decimated-reordering search advantageously provides for one or more of the following: each search takes a fixed amount of time, thereby making scheduling calculations less complex; pilots are searched equally often, irrespective of window sizes; less-likely candidates for idle handoff (pilots with longer window sizes) are not given precedence over more likely idle handoff candidates; and, as search results are accumulated, the amount of unsearched PN space within a window decreases, thereby decreasing the probability that a strong pilot may be found (i.e., decreasing the information value of the search) which in turn can be used for more intelligent scheduling.

While this approach can add overhead due to increased messaging, the overhead can be offset to a selected degree by choosing an appropriate overhead ratio. A recommended value for the ratio of overhead time to a search time for a decimated search would be 33%. Using for example the search-time criteria discussed in ANSI-J-STD-018, TIA, the overhead on a search is 5.3 ms. Thus, the hardware search time for a decimated window can be 10.6 ms. If we assume NL=2048, the maximum window size for which no decimation would be necessary is:

$$\left\lfloor \left\lfloor \frac{10.6e-3}{NLT_{chip}} \right\rfloor \cdot 32 \cdot Sres \right\rfloor_{WSize} = 80 \forall\, Sres = 1/2$$

In other implementations, this number can be made even smaller by shortening the overhead times, e.g., via software programming.

As an example application of the decimation-reordering search, assume that the number of chips defining the threshold window size for a pilot search is 80. If the window size specified is not greater than 80 chips, then the window is searched in a single search. If the window size specified is greater than 80 chips, the specified window is decimated into sub-windows such that each sub-window is equal to or less than 80 chips. These sub-windows are arranged such that the larger ones are biased towards longer delay, while the smaller ones are biased towards shorter delay. The sub-windows are then scheduled for searching from higher to lower priorities according to a selected prioritization scheme, e.g., random or dynamic. The decimated windows thus obtained are then as specified below:

| SRCH_WIN_X | Window Size (PN Chips) | Sub Window | Sub Window Size |
|---|---|---|---|
| 10 | 100 | 1 | {PN + 29, PN − 50} |
|  |  | 2 | {PN + 49, PN + 30} |
| 11 | 130 | 1 | {PN + 14, PN − 65} |
|  |  | 2 | {PN + 64, PN + 15} |

-continued

| SRCH_WIN_X | Window Size (PN Chips) | Sub Window | Sub Window Size |
|---|---|---|---|
| 12 | 160 | 1 | {PN − 1, PN − 80} |
|  |  | 2 | {PN + 79, PN} |
| 13 | 226 | 1 | {PN − 34, PN − 113} |
|  |  | 2 | {PN + 46, PN − 33} |
|  |  | 3 | {PN + 113, PN + 47} |
| 14 | 320 (Can use 226) | Same as above | Same as above |
| 15 | 452 (Can use 226) | Same as above | Same as above |

One exception to this rule is the Active Set pilot (corresponding to the base station whose carrier is being demodulated (versus being just monitored), which should be searched using a non-decimated single search over the entire window as specified, for example, in IS-95B, TIA. As discussed in connection with ANSI-J-STD-008, TIA and IS-95B, TIA, search priorities for each pilot are a useful factor to be considered. If the neighbor set is full and the search window specified for each neighbor is close to the maximum value, the number of searches needed to cover all the pilots within a correlation time will be beyond the capacity of a 100 Hz searcher. In such a case and according to the present invention, a prioritization scheme is used to determine which of the pilot signals needs to be searched first. According to additional aspects of the present invention, two main classes of prioritization approaches are used in addressing this issue. These prioritization approaches are dynamic queuing and priority-based ordering.

Dynamic queuing involves setting an initial prioritization and then changing this prioritization based on other criteria. It will be appreciated that implementations of this approach can include setting an initial prioritization with some priority weighting given to either a decimated pilot window and/or to a nondecimated pilot window. In this regard, the searched pilots and the pilots that need to be searched are tracked by lowering the priority assigned to each pilot every time it is searched, and to have an aging factor to increase the priority after the search results expire.

A specific implementation of this dynamic queuing approach is as follows. First, the initial priorities of the pilots to be searched are the same as the priorities specified in the Extended or General Neighbor List Message. If the Neighbor List Message is used, all Neighbor Set priorities can be assigned the value 2 (for a medium priority assignment). One way to manage the prioritization is to lower the priority of a searched pilot to −1 (which is lower than remaining set) after it has been searched. This value should be kept for 8 unit slot cycles (i.e., 10.24 seconds, same as average correlation time) after which the original priority should be restored. If the decimated search strategy (as described above) is used, the priority should be lowered towards the base value of −1 in proportion to the ratio of the PN chips searched to the total window size.

Among the Neighbor and Remaining Set pilots the one with the maximum priority should be searched. If there are multiple pilots with maximum priority, a random choice should be made. Advantages of this approach include the ability to keep the search scheduling dynamic, and hence always optimal, although it can be appreciated that the overhead instructions may be desirable to recalculate the priorities after each search and that such recalculation is not optimal for pipeline search requests.

In an example priority-based ordering approach according to the present invention, a circular order of searches is maintained. The search requests in the order are inserted such that pilots with higher priority are searched more often than pilots with lower priority. The searches then take place sequentially in a circular fashion in accordance with the ordering scheme. Once the ordering is performed it is not changed dynamically. The only time a re-ordering is necessary is in the event of a "Panic" search, Idle handoff or receipt of a new Neighbor List. A simple way to order the search requests is repeating each pilot search request (after decimation, if necessary) a number of times corresponding to its priority, and then performing a perfect shuffle to obtain a "randomized" order. The perfect shuffle rule is a data shuffling technique where elements in a block of data of size $2^N$ is numbered serially from 0 to $2^N-1$ using N-bit addresses. The bits in each address are then reversed in order such that the LSB becomes the MSB and all other bits are shifted to their mirror reflection (e.g., abcde becomes edcba). The elements are then shifted to the places corresponding to their new addresses.

Advantageously, this example priority-based ordering approach can be implemented in a number of different ways, including as a look up table that is computed after receiving a Neighbor List, since the ordering of the search is predetermined. There is no need for computation before every search request to determine which search needs to be performed, thereby reducing the CPU's necessary MIPs. Further, since the order of searches is known beforehand it will be very easy to perform pipelined and periodic searches. For dual-dwell searches in which the window is reviewed using first a coarse mode and then followed by a fine mode before the decision performed in the search engine, it is possible to simply download the entire order table to the search engine at the beginning of the search and to let the search engine run through the cycles and send the results out periodically. Because of these advantages, this priority-based ordering approach can be more advantageous for certain applications.

In another specific example embodiment employing this priority-based ordering approach, the demodulator executes many steps to change the carrier frequency at which the searches are being performed. In this approach, only searches in the active frequency are performed regularly. After receiving a Neighbor List, the receiver's CPU (or other data processor arrangement) identifies the pilots that are candidates for a decimated search (SRCH_WIN_NGHR>9) and decimates them as described above. If individual pilot priorities are specified with the pilot signals, the CPU arranges the decimated searches in an array such that every pilot search request (including decimated portions of search) are repeated (SEARCH_PRIORITY+1) times. If individual priorities are not specified, each search is repeat once. The CPU then shuffles this array using the perfect shuffle rule as discussed above. If there are less than $2^N$ entries, empty entries are used and removed later. The shuffled array is the order in which the searches are to be performed. The first search corresponds to the first entry in the array; after the last search in the array is completed, the first search will be performed. The Active Set is to be searched before every assigned slot in order to achieve finger assignment, and hence typically overrides all other search requests. The Remaining Set will be considered to have SEARCH_PRIORITY=-1, and hence is not searched using this scheme. In one embodiment, the Remaining Set pilots are searched only under "Panic" Search conditions which can be predetermined conditions provided by the system specifications.

The following example helps to illustrates how the decimated search and priority-based queuing, according to the present invention, can work. In this example, the General Neighbor List message specifies the following neighbor list.

| Pilot PN | Priority | Window Size |
|---|---|---|
| P1 | 2 | 60 |
| P2 | 1 | 100 |
| P3 | 0 | 226 |

Without the decimation and search prioritization scheme, the CPU searches the pilots by spending more time searching the lower priority pilots, which also have larger window sizes. Moreover, the consecutive searches of the lower priority pilots are more frequent than those of the higher priority pilots. After implementing the decimation scheme the pilot searches are broken up as depicted in the following table:

| Pilot PN | Priority | Window Size |
|---|---|---|
| P1 | 2 | 60 |
| P2(1) = {P2 + 29, P2 − 50} | 1 | 80 |
| P2(2) = {P2 + 49, P2 + 30} | 1 | 20 |
| P3(1) = {P3 − 34, P2 − 113} | 0 | 80 |
| P3(2) = {P3 + 46, P3 − 33} | 0 | 80 |
| P3(3) = {P3 + 113, P3 + 47} | 0 | 66 |

After repeating each pilot search corresponding to (SEARCH_PRIORITY+1) times, the result is:

| Pilot PN | Priority | Window Size |
|---|---|---|
| P1 | 2 | 60 |
| P1 | 2 | 60 |
| P1 | 2 | 60 |
| P2(1) = {P2 + 29, P2 − 50} | 1 | 80 |
| P2(2) = {P2 + 49, P2 + 30} | 1 | 20 |
| P2(1) = {P2 + 29, P2 − 50} | 1 | 80 |
| P2(2) = {P2 + 49, P2 + 30} | 1 | 20 |
| P3(1) = {P3 − 34, P2 − 113} | 0 | 80 |
| P3(2) = {P3 + 46, P3 − 33} | 0 | 80 |
| P3(3) = {P3 + 113, P3 + 47} | 0 | 66 |

After padding this list with 6 notional null elements (to make it of size $16=2^4$ (introduced purely for illustrative purposes)) and performing the perfect shuffle, the result is:

| Pilot PN | Priority | Window Size |
|---|---|---|
| P1 | 2 | 60 |
| P3(2) = {P3 + 46, P3 − 33} | 0 | 80 |
| P2(2) = {P2 + 49, P2 + 30} | 1 | 20 |
| P1 | 2 | 60 |
| P2(2) = {P2 + 49, P2 + 30} | 1 | 20 |
| P1 | 2 | 60 |
| P3(3) = {P3 + 113, P3 + 47} | 0 | 66 |
| P2(1) = {P2 + 29, P2 − 50} | 1 | 80 |
| P2(1) = {P2 + 29, P2 − 50} | 1 | 80 |
| P3(1) = {P3 − 34, P2 − 113} | 0 | 80 |

Figure 2:
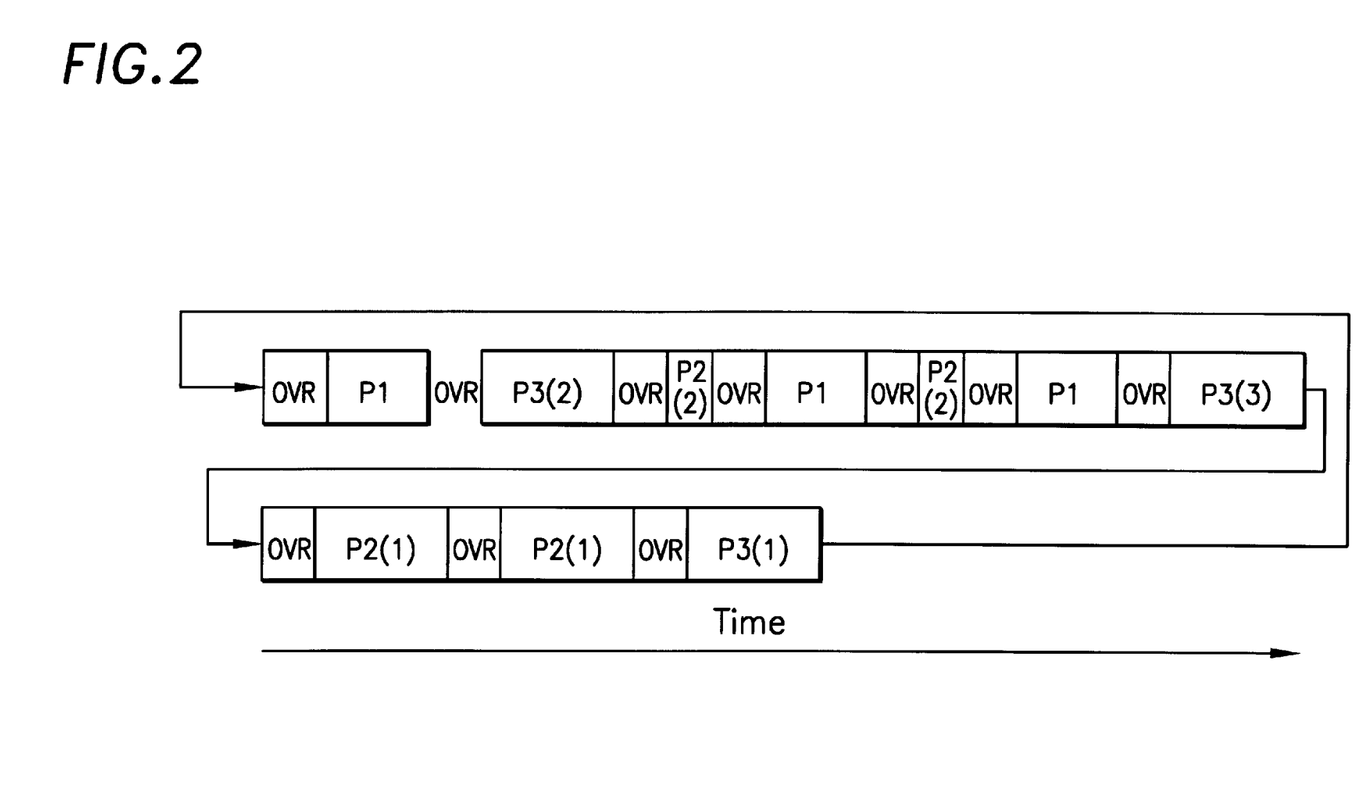
FIG. 2 is a flow diagram, according to a specific example approach embraced by the present invention, of prioritization and reordering for pilot signal windows after decimation.

Accordingly, after decimation, prioritization and reordering, the search is performed as depicted in FIG. 2 where it can be seen that, due to the prioritization scheme, the searcher (i.e., the searching block as executed by CPU) spends relatively more time searching for the higher priority pilots than it does for the lower priority ones. Also, due to the decimation strategy, the searcher does not spend too much time searching for any one pilot, irrespective of the original window size. Finally, due to the reordering scheme, the approach results in the frequency of search of any pilot being more or less related to the search priority of that pilot (e.g., the time interval between searches for higher priority pilots are lower than those for lower priority pilots). The only pilot in this example where this is not the case is the first sub-window of P2 (i.e., P2(1), for which the two searches happen to be contiguous). This instance is an example anomaly occurrence attributable to the way the set was defined and the shuffle was done. For particular applications, the frequency of such occurrences varies, partly based on the design of the particular reordering scheme.

In view of the above, it can be recognized that various embodiment of the present invention provide significant advantages for pilot signal strength searching in communication systems including, but not necessarily limited to pilot signal strength searching for handoff purposes in cellular communication systems.

The various embodiments described above are provided by way of illustration only and are not intended to limit the invention. Those skilled in the art will readily recognize various modifications and changes that may be made to the present invention without strictly following the example embodiments and applications illustrated and described herein. The scope of the present invention is set forth in the following claims.

What is claimed is:

1. For use in a CDMA communication system, a method of searching a set of pilot signals including a first pilot signal having a search window length that is greater than a threshold number of chips and including a second pilot signal having a search window length that is not greater than the threshold number of chips, comprising:
    decimating the search window for the first pilot signal into a plurality of sub-windows; and
    searching the second pilot signal and one of the sub-windows based on a prioritization criteria that is common to each of the second pilot signal and one of the sub-windows.

2. The method of claim 1, wherein the prioritization criteria is a part of a pilot specification specified for one of the first and second pilot signals.

3. The method of claim 2, wherein searching based on a prioritization criteria includes searching for a common search duration, each of the second pilot signal and said one of the sub-windows.

4. The method of claim 3, wherein searching based on a prioritization criteria includes searching each of the first and second pilot signals equally often, regardless of their respective window sizes.

5. The method of claim 4, wherein searching based on a prioritization criteria further includes accumulating search results after searching one of the sub-windows for the first pilot signal, wherein as search results are accumulated, PN space corresponding to unsearched sub-windows decreases with said accumulation.

6. The method of claim 4, wherein searching based on a prioritization criteria further includes accumulating search results after searching one of the sub-windows for the first pilot signal, wherein as search results are accumulated, the likelihood of identifying the first pilot signal as a strong pilot signal decreases.

7. The method of claim 1, wherein the prioritization criteria is dynamic.

8. The method of claim 7, wherein dynamism of the prioritization criteria is a function of the number of sub-windows searched for the first pilot signal.

9. The method of claim 1, wherein the prioritization criteria is a function of priority-based ordering.

10. The method of claim 1, wherein the set of pilot signals includes at least one specified pilot signal that is not decimated.

11. A CDMA communication system adapted to search a set of pilot signals including a first pilot signal having a search window length that is greater than a threshold number of chips and including a second pilot signal having a search window length that is not greater than the threshold number of chips, comprising:
    means for decimating the search window for the first pilot signal into a plurality of sub-windows; and
    means for searching the second pilot signal and one of the sub-windows based on a prioritization criteria that is common to each of the second pilot signal and one of the sub-windows.

12. The system of claim 11, further including a plurality of cellular base stations adapted to generate the set of pilot signals.

13. A mobile station in a CDMA cellular communication system adapted to search a set of pilot signals including a first pilot signal having a search window length that is greater than a threshold number of chips and including a second pilot signal having a search window length that is not greater than the threshold number of chips, comprising:
    means for decimating the search window for the first pilot signal into a plurality of sub-windows; and
    means for searching the second pilot signal and one of the sub-windows based on a prioritization criteria that is common to each of the second pilot signal and one of the sub-windows.

14. A CDMA cellular communication system, comprising:
    a plurality of base stations adapted to be located to cover a designated geography by communicating in respective geographic cells, each base station being adapted to generate a pilot signal, wherein the pilot signals generated by the plurality of base stations form a set of pilot signals including a first pilot signal having a search window length that is greater than a threshold number of chips and including a second pilot signal having a search window length that is not greater than a threshold number of chips;
    a plurality of mobile stations, each mobile station including a signal processor circuit that is configured and arranged to search the set of pilot signals, to decimate the search window for the first pilot signal into a plurality of sub-windows, and to search the second pilot signal and one of the sub-windows based on a prioritization criteria that is common to each of the second pilot signal and one of the sub-windows.

15. The CDMA cellular communication system of claim 14, wherein the prioritization criteria is a part of a pilot specification specified for one of the first and second pilot signals.

16. The CDMA cellular communication system of claim 15, wherein searching based on a prioritization criteria includes searching for a common search duration, each of the second pilot signal and said one of the sub-windows.

17. The CDMA cellular communication system of claim 16, wherein searching based on a prioritization criteria includes searching each of the first and second pilot signals equally often, regardless of their respective window sizes.

18. The CDMA cellular communication system of claim 17, wherein searching based on a prioritization criteria further includes accumulating search results after searching one of the sub-windows for the first pilot signal, wherein as search results are accumulated, PN space corresponding to unsearched sub-windows decreases with said accumulation.

19. The CDMA cellular communication system of claim 17, wherein searching based on a prioritization criteria further includes accumulating search results after searching one of the sub-windows for the first pilot signal, wherein as search results are accumulated, the likelihood of identifying the first pilot signal as a strong pilot signal decreases.

20. The CDMA cellular communication system of claim 14, wherein the prioritization criteria is dynamic.

21. The CDMA cellular communication system of claim 20, wherein the dynamism of the prioritization criteria is a function of the number of sub-windows searched for the first pilot signal.

22. The CDMA cellular communication system of claim 14, wherein the prioritization criteria is a function of priority-based ordering.

23. The CDMA cellular communication system of claim 14, wherein the set of pilot signals includes an active-set pilot signal that is not decimated.

* * * * *